US011283643B2

(12) United States Patent
Kota Sathish et al.

(10) Patent No.: US 11,283,643 B2
(45) Date of Patent: Mar. 22, 2022

(54) EFFICIENT AND RELIABLE DATA PATH FOR HOSTED APPLICATIONS ON ACCESS POINT

(71) Applicant: Cisco Technology, Inc., San Jose, CA (US)

(72) Inventors: Shashank Kota Sathish, San Jose, CA (US); Robert C. Meier, Cuyahoga Falls, OH (US); Rahul Dasgupta, San Jose, CA (US); Manoj Gupta, Santa Clarita, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 16/119,971

(22) Filed: Aug. 31, 2018

(65) Prior Publication Data

US 2020/0076641 A1 Mar. 5, 2020

(51) Int. Cl.
| | |
|---|---|
| *H04L 12/28* | (2006.01) |
| *H04L 12/717* | (2013.01) |
| *H04L 12/46* | (2006.01) |
| *H04L 29/08* | (2006.01) |
| *H04L 12/24* | (2006.01) |
| *H04L 69/329* | (2022.01) |
| *H04L 41/0806* | (2022.01) |
| *H04L 45/42* | (2022.01) |

(52) U.S. Cl.
CPC ...... *H04L 12/2856* (2013.01); *H04L 12/4633* (2013.01); *H04L 41/0806* (2013.01); *H04L 45/42* (2013.01); *H04L 69/329* (2013.01)

(58) Field of Classification Search
CPC . H04L 12/4633; H04L 45/42; H04L 12/2856; H04L 41/0806; H04L 69/329; H04L 12/4641
See application file for complete search history.

(56) References Cited

U.S. PATENT DOCUMENTS

| | | | |
|---|---|---|---|
| 2004/0083388 A1* | 4/2004 | Nguyen | H04L 63/0236 726/11 |
| 2016/0036700 A1* | 2/2016 | Unnimadhavan | H04L 45/74 370/392 |
| 2016/0315785 A1* | 10/2016 | Dronadula | H04L 12/4633 |
| 2017/0034669 A1* | 2/2017 | Dronadula | H04L 43/028 |

OTHER PUBLICATIONS

Cisco, Wireless LAN Controller (WLC) Design and Features FAQ, Document ID: 118833, Updated Mar. 2, 2015, 23 pages.

(Continued)

*Primary Examiner* — Abdulkader M Alriyashi
(74) *Attorney, Agent, or Firm* — Patterson + Sheridan, LLP

(57) ABSTRACT

Systems, methods, and computer program products to provide direct external network access at an access point (AP) in a managed wide area network (WAN). The method may include establishing an application host interface (AHI) at an access point and receiving application data from one or more client devices connected to the access point. The method may also include determining that the application data is received from a permitted application as shown in a list of applications permitted to use the AHI and routing, using the AHI, the received application data to the data destination via the external network thereby bypassing the WLC.

20 Claims, 7 Drawing Sheets

(56) References Cited

OTHER PUBLICATIONS

RFC 5415—Control And Provisioning of Wireless Access Points (CAPWAP) Protocol Sp . . . p. 1 of 156, Mar. 2009.
"Configuring DHCP Proxy," Cisco Wireless LAN Controller Configuration Guide, Release 7.4.
Cisco, Understanding Bridge Virtual Interface (BVI) and Bridge Domain Interface (BDI), Updated:Sep. 9, 2016, Document ID:200650, 6 pages.

\* cited by examiner

EFFICIENT AND RELIABLE DATA PATH FOR HOSTED APPLICATIONS ON ACCESS POINT

TECHNICAL FIELD

Embodiments presented in this disclosure generally relate to providing direct outside network access for applications executing in a managed wide area network. More specifically, embodiments disclosed herein relate to providing an application host interface at an access point to provide access from the access point to an outside network such as the internet.

BACKGROUND

In managed wide area networks, such as enterprise wireless networks, access points (AP) are usually placed within a firewall which prevents direct connection to outside world. This arrangement induces all traffic to be routed to a central controller before connecting to an external network such as the Internet. Routing all traffic through a central controller increases the amount of required network resources to and increases the costs of maintaining the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
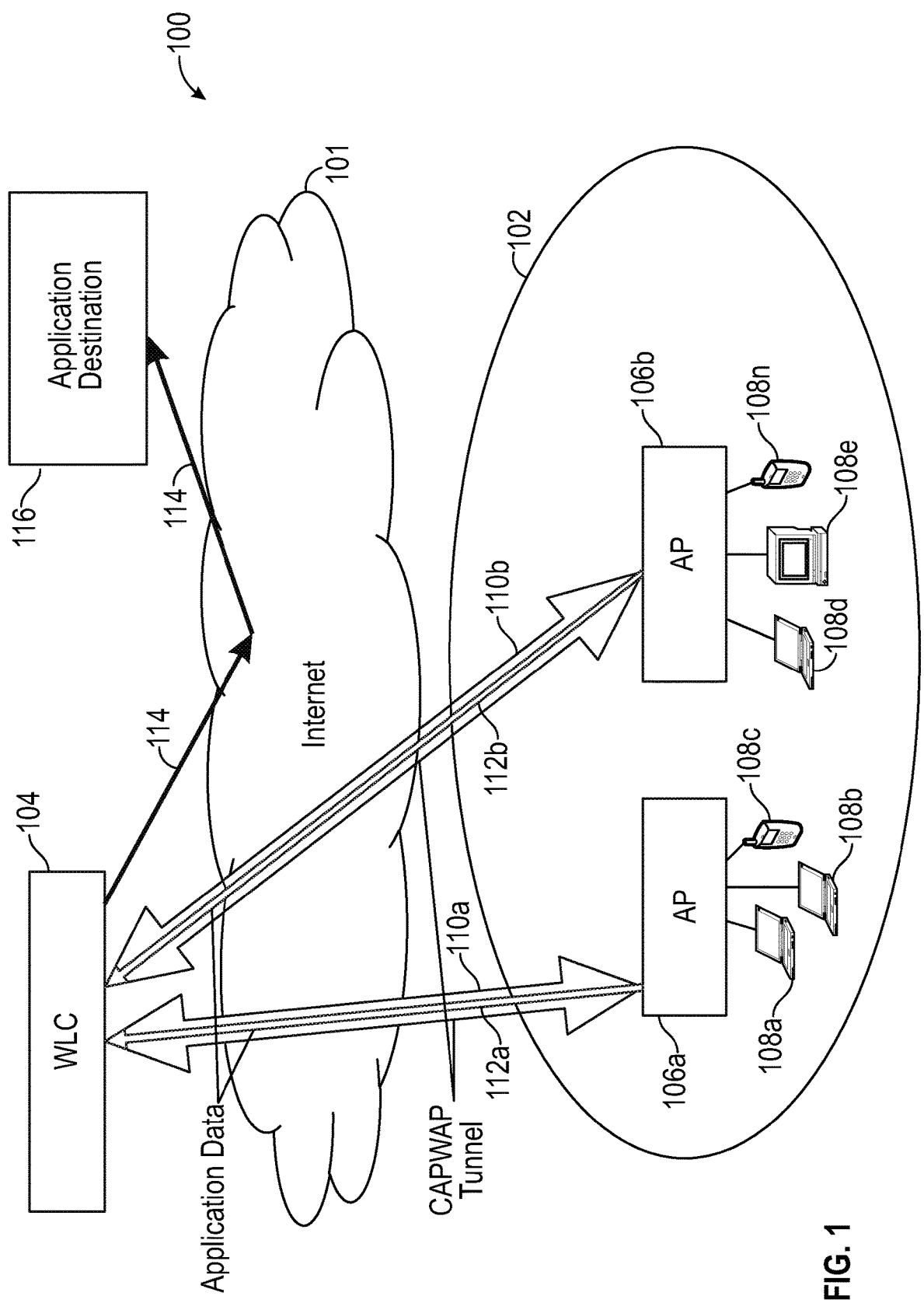
FIG. 1 illustrates a managed wide area network, according to one embodiment.

One embodiment presented in this disclosure is a method for providing direct external network access at an access point (AP) in a managed wide area network (WAN). The method includes establishing, at the AP, an application host interface (AHI) allowing data to access an external network while bypassing a first subnet of the AP connected to a wireless local access network controller (WLC) and receiving application data from one or more client devices, where the application data comprises a data destination. The method also includes determining, from a list of applications permitted to use the AHI, that the application data is received from a permitted application and routing, using the AHI, the received application data to the data destination via the external network thereby bypassing the WLC.

One embodiment presented in this disclosure is a system for providing direct external network access at an access point (AP) in a managed wide area network (WAN). The system includes a processor and a memory comprising instructions which, when executed on the processor, performs an operation for providing direct external network access at an access point (AP) in a managed wide area network (WAN). The operation includes establishing, at the AP, an application host interface (AHI) allowing data to access an external network while bypassing a first subnet of the AP connected to a wireless local access network controller (WLC) and receiving application data from one or more client devices, where the application data comprises a data destination. The operation also includes determining, from a list of applications permitted to use the AHI, that the application data is received from a permitted application and routing, using the AHI, the received application data to the data destination via the external network thereby bypassing the WLC.

One embodiment presented in this disclosure is a computer program product for providing direct external network access at an access point (AP) in a managed wide area network (WAN). The computer program product comprises a non-transitory computer-readable medium program having program instructions embodied therewith, the program instructions executable by a processor to perform an operation. The operation includes establishing, at the AP, an application host interface (AHI) allowing data to access an external network while bypassing a first subnet of the AP connected to a wireless local access network controller (WLC) and receiving application data from one or more client devices, where the application data comprises a data destination. The operation also includes determining, from a list of applications permitted to use the AHI, that the application data is received from a permitted application and routing, using the AHI, the received application data to the data destination via the external network thereby bypassing the WLC.

Example Embodiments

In centrally managed wide area networks (WAN), such as enterprise level wireless networks, access points (AP) are usually placed within a firewall which prevents direct connection to the outside world (i.e. direct connection to the internet). This arrangement allows the enterprise (i.e. the entity managing the network) to both monitor and restrict traffic on the network through a controller and to provide security to network assets. In some deployments, APs have a flexconnect mode, which places the APs into a subnet without direct access to external networks, such as the Internet. This kind of deployment prevents applications hosted on the AP and application data received from client devices connected to the AP from reaching the Internet directly.

FIG. 1 illustrates a managed wide area network, according to one embodiment. The network system 100 includes a managed wide area network 102 which is managed/controlled by a wireless local area network controller (WLC) 104. As shown in FIG. 1, the WLC 104 is located remotely from the managed network 102. The network connection between the WLC and the network 102 may be accomplished over the Internet 101 (using internet protocol (IP) tunnels) and/or by a private or local connection. As shown in FIG. 1, access points (APs) 106a and 106b are connected to the WLC using Control and Provisioning of Wireless Access Points (CAPWAP) tunnels 110a and 110b to the WLC (over the internet 101). As further shown in FIG. 1, client devices 108a-108n are connected to APs 106a and 106b. The client devices generate application data to be sent over the internet to an application destination 116. For example, a connected device 108, such as an Internet of things (IoT) enabled thermostat, may continuously generate environmental data observed at the thermostat to send to a server (e.g., application destination 116) for monitoring and controlling the thermostat. In some examples, the application destination 116 is managed/owned/controlled by the enterprise managing the WLC 104 and network 102. In other examples, the application destination 116 includes an outside server maintained by another service provider.

In order to provide applications (and their data plane traffic) access to the internet, in one embodiment, AP 106a and AP 106b forward all data traffic (i.e. data traffic in a data plane) of the applications running on the APs and data received from applications on the client devices 108a-108n) that needs to be routed through the Internet 101 (and ultimately application destination 116) to the WLC 104 by encapsulating the application data with CAPWAP encapsulation and transmitting encapsulated application data 112a and 112b to the WLC 104. The WLC then removes the CAPWAP encapsulation and routes the unencapsulated application data 114 to the Internet 101 and ultimately the application destination 116.

One example disadvantage of this CAPWAP forwarding approach is that the CAPWAP tunnel may only work for user datagram protocol (UDP) traffic, since CAPWAP in itself is over UDP. As a result, applications requiring a reliable transport, such as application using Transmission Control Protocol (TCP), cannot utilize the CAPWAP tunnel to transmit application data 112 to the application destination 116. Furthermore, forwarding all of the data traffic in the data plane through a CAPWAP tunnel also creates a network bottleneck at the WLC 104. In some example enterprise level deployments, thousands of APs may be managed by one WLC, such as WLC 104. Additionally, some connected applications may send data as frequently as every few milliseconds. As more and more devices as connected to networks, including IoT devices, there will more applications which require connectivity with internet and each additional connected application on an AP, such as APs 106a and 106b increases the resulting application data traffic load on the managing WLC 104 and worsens the data traffic bottleneck.

Figure 2:
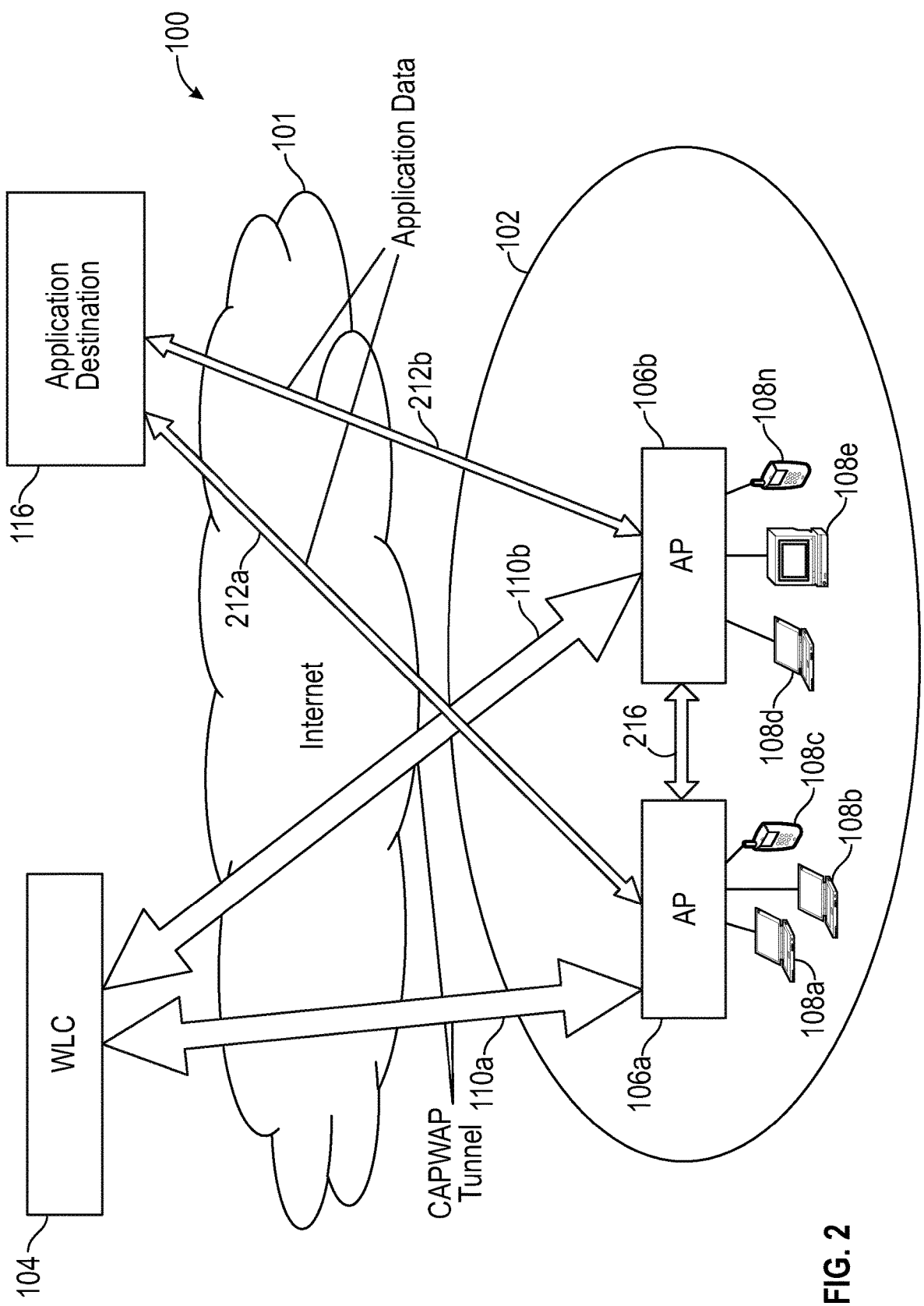
FIG. 2 illustrates a managed wide area network with an application host interface, according to one embodiment.

Turning now to FIG. 2, which illustrates a managed wide area network with an application host interface, according to one embodiment. In some examples, the APs 106a and 106b includes connections to a subnet (e.g., a non-native subnet) with connections to an external or non-private network, such as the Internet, which may be reserved for other uses such as an internet connection for wireless client devices. As described herein in relation to FIGS. 3-9, an application host interface (AHI) may be established at the APs in the network 102. For example, AP 106a and AP 106b may each establish an AHI on the subnet connected to the internet 101 to provide access to the AP 106 to route application data directly to the Internet 101. As shown in FIG. 2, the APs 106a and 106b may directly route application data 212a and 212b from applications on the APs and from the client devices 108a-108n directly to the application destination 116 via the internet 101 thereby bypassing the WLC 104. In some examples, the application data may be generated by client devices 108a-108n. In other examples, the application data may be generated and or received by applications executing on an AP, such as APs 106a and 106b. For example, applications executing on the APs may receive application data from client devices and/or generate application data. For example, the application executing on the APs may generate data related to Bluetooth Low Energy (BLE) management data, hyperlocation data such as Wi-Fi angle of arrival (AoA) data, data traffic generated by container applications running on an AP, and/or intelligent capture data.

In some examples, to preserve network resources such as Internet Protocol version 4 (IPV4) addresses and to limit the exposure of the network 102 to non-managed networks, one AP in the managed network may be used to establish an AHI and the other APs in the network 102 forwards the application data received at that AP to an AP with a AHI interface. For example, AP 106a may be used to establish an AHI and application data received at AP 106b is forwarded from AP 106b to AP 106a as application data 216, prior to being routed to the application destination 116 in a manner which bypasses the WLC 104.

In some embodiments, the AHI interfaces on APs 106a and 106b block incoming network traffic to keep the network 102 secure. In another embodiment, the AHI interfaces on APs 106a and 106b receive application data 212a and 212b by opening a specified network port for receiving application data from the Internet 101 at the AP.

Figure 3:
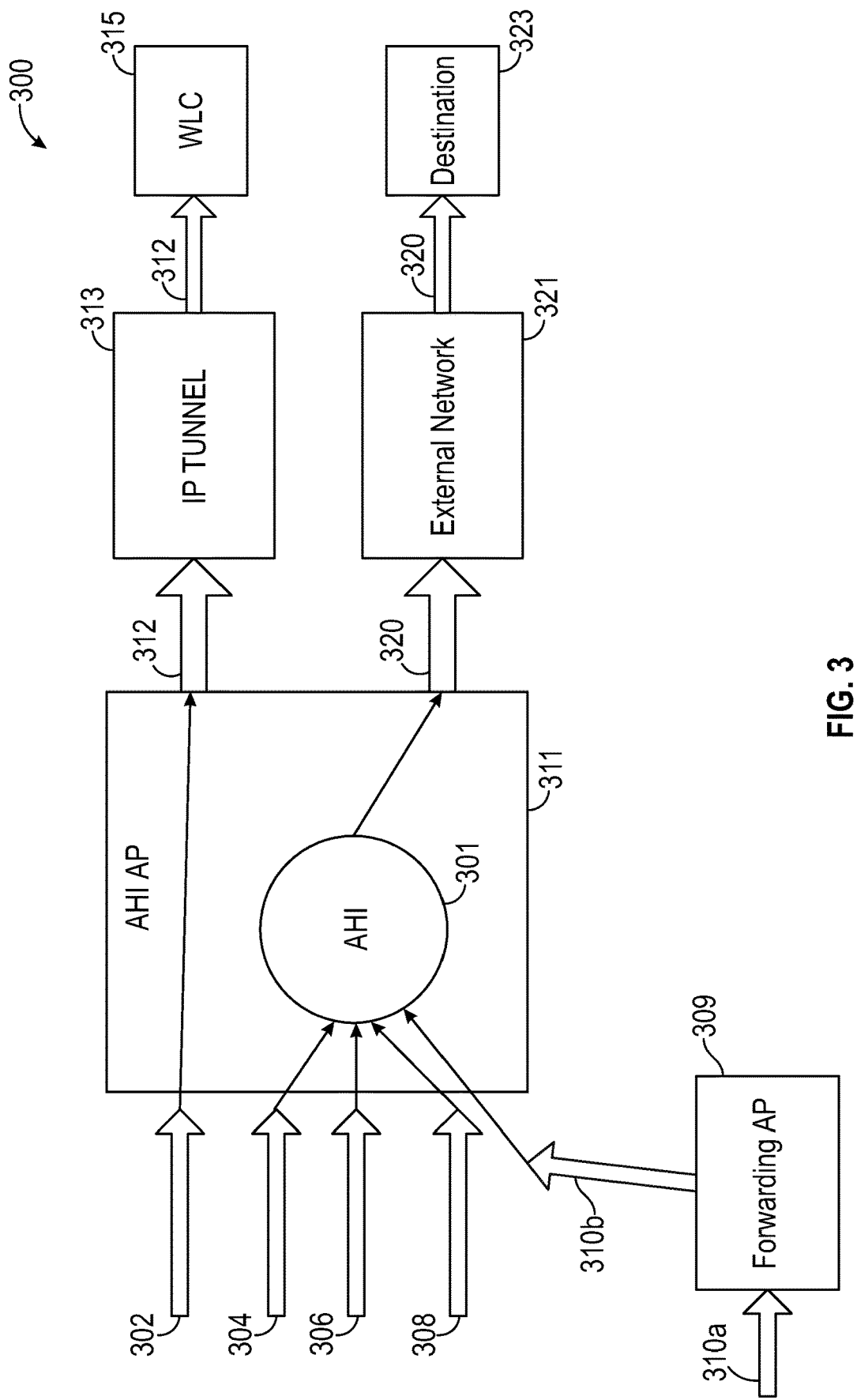
FIG. 3 is a block diagram of a managed wide area network with an application host interface, according to one embodiment.

FIG. 3 is a block diagram of a managed wide area network with an application host interface, according to one embodiment. Arrangement 300 includes application data 302, 304, 306, 308, and forwarding application data 310. As illustrated in FIG. 3, the arrangement 300 is a block diagram of the components managed network 102 and other components illustrated in FIG. 2. The application data 302-308 may be received from client devices connected to the AHI AP 311 or may be generated by applications running on an access point, such as AHI AP 311 and/or forwarding AP 309. In some examples, as described above in relation to FIG. 2, each AP in a managed network (e.g., APs 106a and 106b in network 102) may comprise an AHI AP such as AHI AP 311. In some examples, a select number of APs in a managed network comprises an AHI AP 311 and the remaining APs comprise forwarding APs 309, which are configured to forward application data to an AHI AP for direct access to an external network such as the internet 101.

In some examples, the AHI 301 is established and/or configured using information at AHI AP 311 received from the WLC 315 pertaining to the virtual local area network the AHI 301 will use to connect to the external network 321. In some examples, the WLC 315 also provides configuration information for whether AHI 301 will be established by AHI AP 311 using dynamic host configuration protocol (DHCP) to obtain an IP address or whether the IP address of AHI 301 may be statically configured by the AHI AP 311. In some examples, the list of applications permitted to use the AHI is also received from the WLC 315 at the AHI AP 311. Applications permitted to use the AHI 301 may include applications running on AHI AP 311 that are required to send data on a subnet, different from the default subnet which was assigned for the AP.

As shown in FIG. 3, the AHI AP 311 determines, from a list of applications permitted to use the AHI, that the application data is received from a permitted application. In some examples, the applications do not have a preference on whether to send data using AHI 301 or a default interface. The AHI AP 311 will determine whether to send a particular application's data over AHI 301 or to send over IP tunnel 313 via a default interface. For example, application data 304, 306, and 308 may be received from an application permitted to use the AHI 301 established on AHI AP 311. Likewise, application data 310 may be received from the forwarding AP 309, the application data 310 also being received at the forwarding AP 309 from an application permitted to use the AHI 301. As further shown in FIG. 3, application data received at the AHI 301 may be further routed or forwarded to the destination 323 via external network 321 by the route 320.

In some examples, application data received at the AHI AP 311 may not be received from or generated by an application permitted to use the AHI 301. For example, the AHI AP 311 may determine that the application data 302 is not permitted to use the AHI 301 and may route the application data to the WLC 315 via the IP tunnel 313 by the route 320. In some examples, the WLC 315 may then forward the application data received by the WLC to the application destination, such as through the external network 321.

Figure 4:
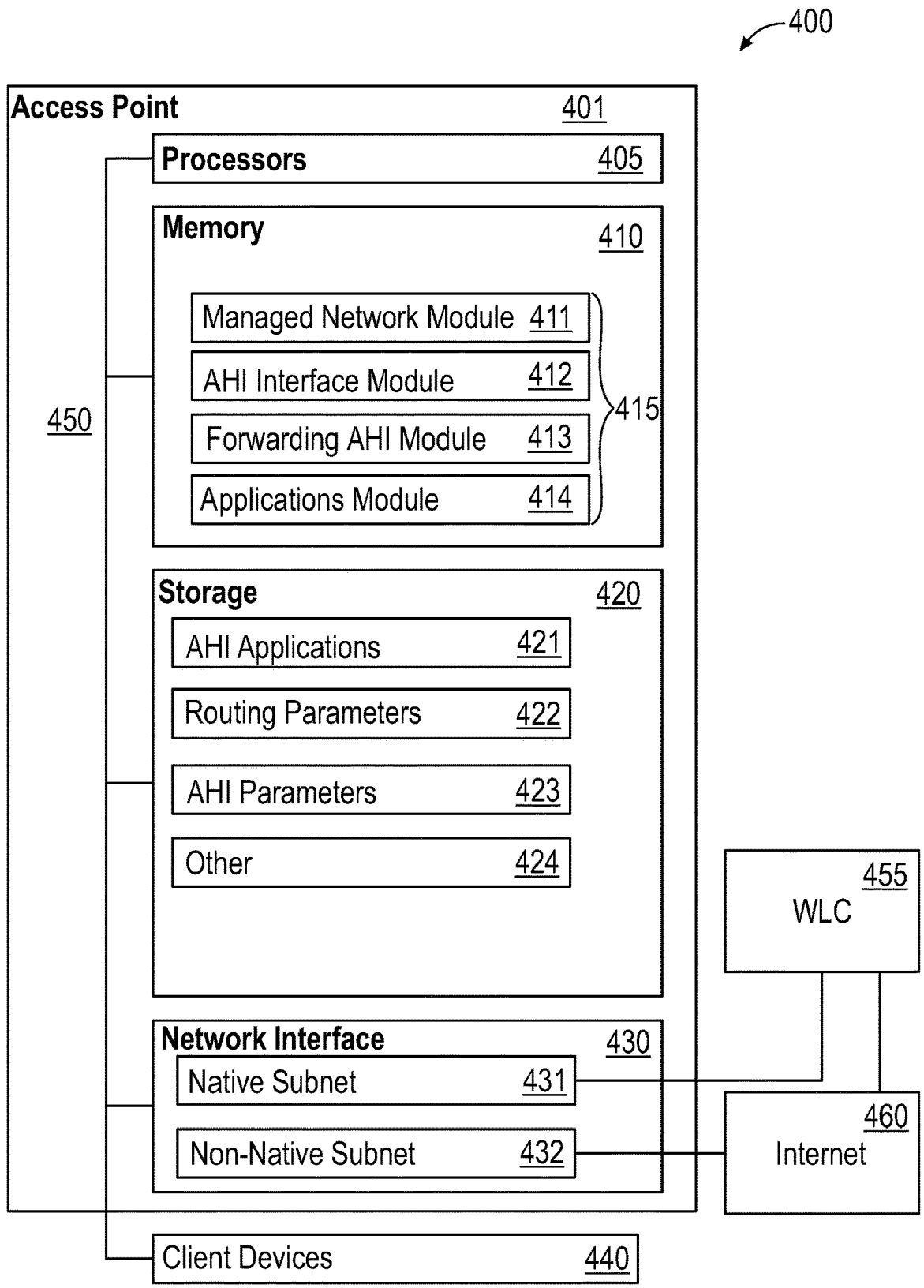
FIG. 4 is a block diagram of an access point to provide direct external network access at an access point (AP) in a managed wide area network (WAN), according to one embodiment.

FIG. 4 illustrates a block diagram of an access point to provide direct external network access at an access point (AP) in a managed wide area network (WAN) according to one embodiment. As shown in FIG. 4, the arrangement 400 may include an access point embodied as server/computer/router or AP 401 configured to execute the function of the network system 100 and perform the methods described herein. The access point (AP) 401 is shown in the form of a general-purpose computing device. The APs 106a, 106b, and the AHI AP 311 may be configured as the AP 401. The components of AP 401 may include, but are not limited to, one or more processors or processing units 405, a system memory 410, a storage system 420, network interface 430, and a bus 450 that couples various system components including the system memory 410 and storage system 420 to processors 405 along with the network interface 430 and various input/output components including client devices 440 (e.g., clients devices 108a-108n). In other embodiments, arrangement 400 is distributed and includes a plurality of discrete computing devices that are connected through wired or wireless networking.

Bus 450 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

AP 401 typically includes a variety of computer system readable media. Such media may be any available media that is accessible by AP 401, and it includes both volatile and non-volatile media, removable and non-removable media.

System memory 410 can include computer system readable media in the form of volatile memory, such as random access memory (RAM) and/or cache memory. AP 401 may further include other removable/non-removable, volatile/non-volatile computer system storage media. In some examples, storage system 420 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 450 by one or more data media interfaces. As will be further depicted and described below, memory 410 may include at least one program product having a set (e.g., at least one) of program modules that are configured to carry out the functions of embodiments of the invention. AP 401 may further include other removable/non-removable volatile/non-volatile computer system storage media. In some examples, storage system 420 may be included as part of memory 410 and may typically provide a non-volatile memory for the networked computing devices, and may include one or more different storage elements such as Flash memory, a hard disk drive, a solid state drive, an optical storage device, and/or a magnetic storage device. Storage system 420 may include media for storing AHI applications 421 (e.g., list of applications permitted to use the AHI). The storage system 420 may also include routing parameters 422, AHI parameters 423 and other data 424 related to the running of programming modules 415. The information stored in storage system 420 may be updated and accessed by the program modules 415 described herein.

Memory 410 may include a plurality of program modules 415 for performing various functions related to providing direct external network access at an access point (AP) in a managed wide area network (WAN) described herein. The modules 415 generally include program code that is executable by one or more of the processors 405. As shown, modules 415 include managed network module 411, AHI interface module 412, forwarding AHI module 413, and applications module 414.

The modules 415 may also interact with each other and storage system 420 to perform certain functions. For example, the managed network module 411 performs processes related to the functioning of the AP 401 in relation to a managed network such as managed network 102 controlled/managed by a controller such as WLC 455 (or WLC 104 as shown in FIG. 2). In some examples, the managed network module 411 routes received application data from one or more client devices 440 or received from applications module 414 executing on the AP 401, through the first subnet and the a CAPWAP tunnel to the WLC 455, using routing parameters 422. The managed network module 411 may also be configured to maintain and execute the native subnet 431 connected to WLC 455 through an internet protocol (IP) tunnel, such as a CAPWAP tunnel. The managed network module 411 may also maintain and execute the non-native subnet 432 connected to an external network such as the internet 460.

As shown in FIG. 4, the modules 415 may also include the AHI interface module 412 configured to establish, at the AP 401, an application host interface (AHI), such as the AHI 301 shown in FIG. 3, allowing data to bypass a first subnet, such as a native subnet 431, of the AP 401, connected to a wireless local access network controller (the WLC 455) to access an external network (e.g., Internet 460). The first subnet may be a private subnet to provide a secure enterprise level network managed by WLC 455 to which the private subnet is connected. In some examples, the AHI is established on or in such a manner to provide access to the internet 460 via non-native subnet 432 using one or more AHI parameters, such as the AHI parameters 423. The AHI interface module 412 may also be configured to receive application data, such as application data 302, 304, 306, and 308 shown in FIG. 3, from one or more client devices 440, where the application data comprises a data destination. In some examples, the application data may be received from client devices 440 (e.g., client devices 108a-108n) via bus 450. In some examples, the application data may be generated by and received from applications module 414. For example, applications module 414 may include one or more IOX applications executing on the AP 401. In some examples, the applications module 414 receives data via the one or more IOX applications and process the data to be received by the one or more other modules running on AP 401, including the AHI interface module 412 and managed network module 411.

The AHI interface module 412 may also be configured to determine, from a list of applications permitted to use the AHI, such as AHI applications 421, that the application data is received from a permitted application. In some examples, the AHI applications include applications that have been configured to use an AHI interface and that have an identification of the application added to the AHI applications 421. In some examples, the AHI applications list may include applications that are included in the AHI applications list at the initiation or initial boot-up of the AP 401, (e.g., a native AHI applications list). In some examples, the AHI applications 421 receives application configuration for information for an additional application, wherein the application configuration information comprises configuration information for the application to use the AHI, and update the list of applications (e.g., AHI applications 421) on the AP 401 permitted to use the AHI to include the additional application.

Additionally, the AHI interface module 412 may also be configured to route, using the AHI, such as AHI 301, the received application data to the data destination (e.g., the destination 323) via the external network (e.g., the external network 321/the internet 460) thereby bypassing the WLC 455. In another example, the AHI interface module 412 determines, from the list of applications on the AP permitted to use the AHI (e.g., AHI applications 421), that the application data is not from a permitted application. In this example, an application that has not been configured to use the AHI or that has not been added to the list will not have its data routed through the AHI. Instead, the data will be routed through the native subnet 431 to the WLC 455.

In some examples, the AHI interface module 412 handles incoming traffic for the AHI applications 421. For example, the AHI interface module 412 receives incoming application traffic from the external network for the list of applications at the AHI. The AHI interface module 412 may open a network port at the network interface 430 to receive the incoming traffic. In some examples, additional traffic security measures may be performed or invoked by the AHI interface module 412 to prevent malicious or other network traffic from entering the managed network 102. In another example, the AHI interface module 412 blocks incoming application traffic from the external network for the list of applications at the AHI. The traffic blocked by the AHI interface module 412 may be routed through the WLC 455 before entering the managed network 102.

As also shown in FIG. 4, the forwarding AHI module 413 processes forwarded application data. For example, AP 401 may be configured as a forwarding AP 309. The AP 401 may then utilize the forwarding AHI module 413 to receive additional application data, determine, from the AHI applications 421, that the additional application data is from a permitted application, and transmit the additional application data to one of the one or more AHI APs (e.g., AHI AP 311) for utilization of the AHI.

Figure 5:
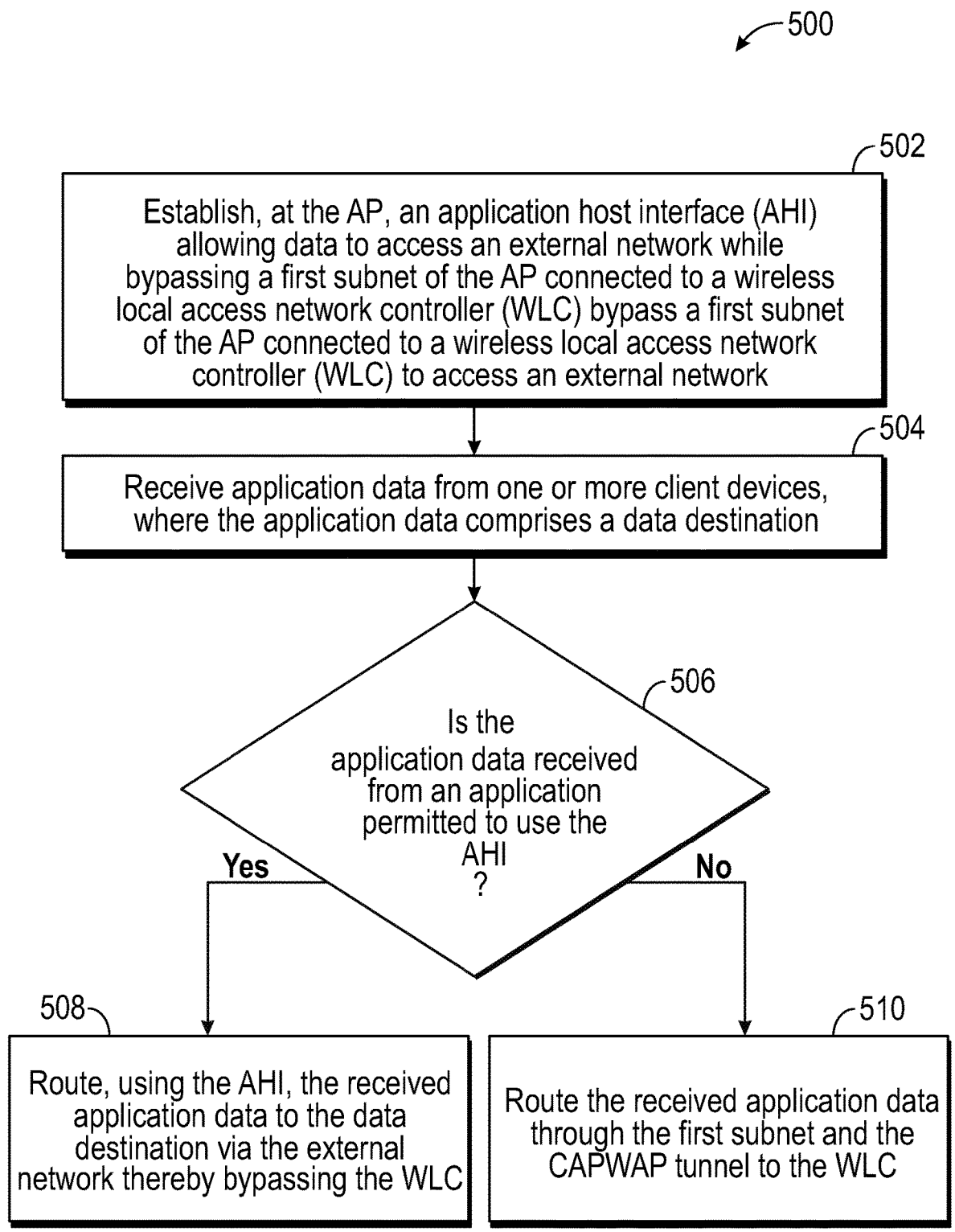
FIG. 5 is a method for providing direct external network access at an access point (AP) in a managed wide area network (WAN), according to one embodiment.

FIG. 5 illustrates a method to provide direct external network access at an access point (AP) in a managed wide area network (WAN), according to one embodiment. Method 500 begins at block 502 where an AP, such as AP 401 establishes an application host interface (AHI) allowing data to bypass a first subnet of the AP connected to a WLC to access an external network. For example as shown in FIG. 3, AHI AP 311 includes the AHI 301 which allows data to bypass a first subnet of the AP connected to WLC 315 to access the external network 321.

At block 504 the AP receives application data from one or more client devices, where the application data includes a data destination. For example, as shown in FIG. 3, the AHI AP 311 receives application data 306 from one or more client devices (shown in FIG. 1 as client devices 108a-108n), where the application data 306 comprises a data destination 323. While described herein as application data received from client devices 108a-108n, the application data 306 may be generated by an application running on the AHI AP 311, such as applications module 414. In another embodiment, the application data 306 is received through applications module 414 before being received by an AHI interface module 412, as shown in FIG. 4.

At block 506, an AP, such as AP 401 is determines, from a list of applications permitted to use the AHI, that the application data is received from a permitted application or is not from a permitted application. For example, the AHI AP 311 in FIG. 3 may determine, from a list of applications permitted to use the AHI 301, that the application data 306 is received from a permitted application. In another example, as shown in FIG. 3, the received application data 302 may be received from an application not permitted to utilize AHI 301.

At block 508, an AP, such as AP 401 routes, using the AHI, the received application data to the data destination via the external network thereby bypassing the WLC. For example, the AHI AP 311 routes, using the AHI 301, the received application data 306 to the data destination 323 via the external network 321 thereby bypassing the WLC 315. In another example, Upon determining that the received application data is not from a permitted application the method 500 continues at block 510, where an AP, such as AP 401 routes the received application data through the an IP tunnel to the WLC.

Figure 6:
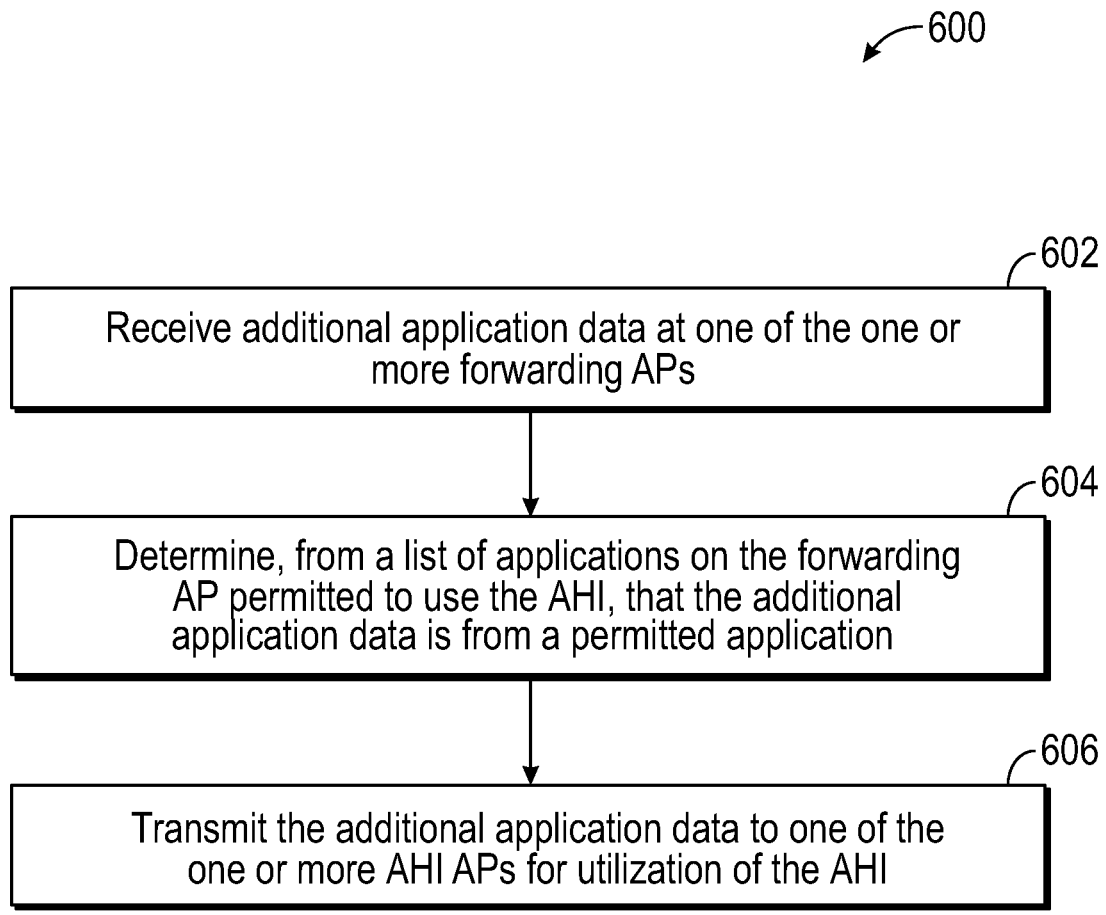
FIGS. 6-7 are additional methods for providing direct external network access at an access point (AP) in a managed wide area network (WAN). according to various embodiments.

FIG. 6 illustrates an additional method to provide direct external network access at an access point (AP) in a managed wide area network (WAN), according to one embodiment. Method 600 begins at block 602 where an AP, such as AP 401 is embodied as a forwarding AP and receives additional application data. For example, as shown in FIG. 3, the forwarding AP 309 receives application data 310a.

The method 600 then continues at block 604, where an AP, such as AP 401 is embodied as a forwarding AP and determines, from a list of applications permitted to use the AHI, that the additional application data is from a permitted application. Upon this determination the method 600 continues at block 606 where an AP, such as AP 401 is embodied as a forwarding AP and transmits the additional application data to one of the one or more AHI APs for utilization of the AHI. For example, as shown in FIG. 3, forwarding AP 309 may determine that application data 310a is from a permitted application and transmit the application data 310b to the AHI AP 311. In some examples, the AHI AP 311, using the AHI 301 then routes the received application data 310b to the data destination 323 via external network 321.

Figure 7:
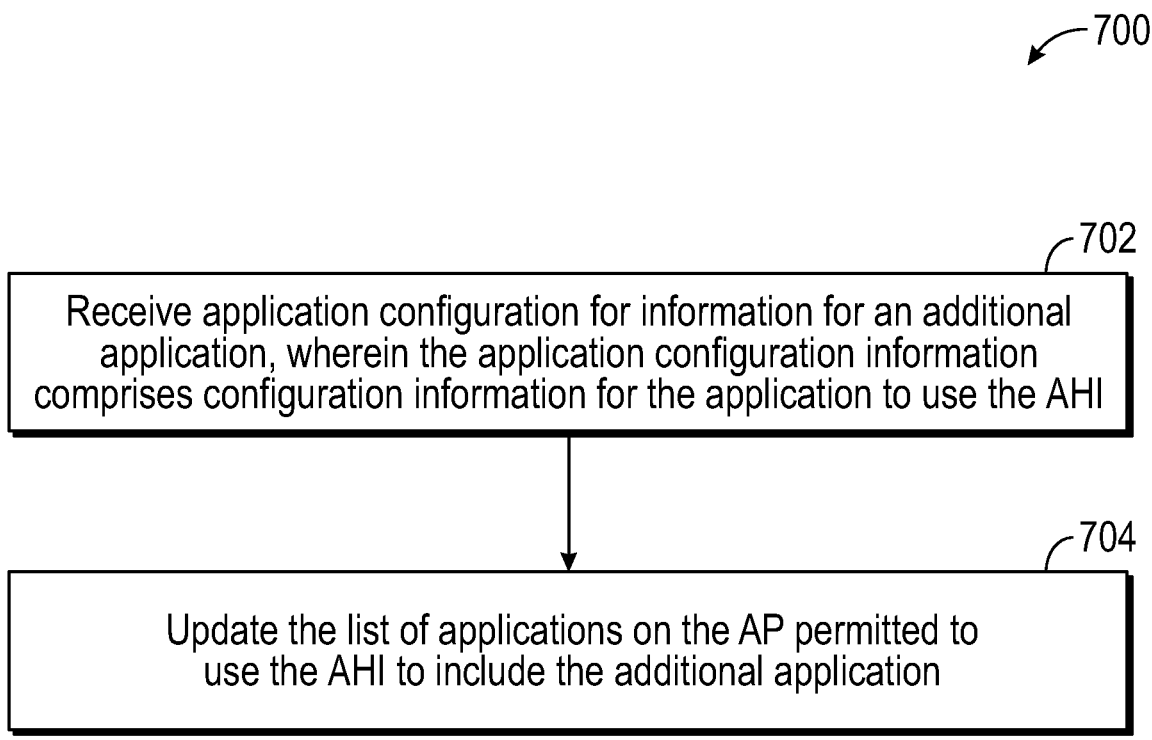

FIG. 7 illustrates an additional method to provide direct external network access at an access point (AP) in a managed wide area network (WAN), according to one embodiment. Method 700 begins at block 702 where an AP, such as AP 401 receives application configuration for information for an additional application, wherein the application configuration information comprises configuration information for the application to use the AHI. For example, as shown in FIG. 4, the AP 401, utilizing AHI interface module 412, receives application configuration for information for an additional application. The configuration information may be received from a client device 440, WLC 455, external network such as internet 460, or another source of application configuration information.

At block 704, method 700 continues where an AP, such as AP 401 updates the list of applications on the AP permitted to use the AHI to include the additional application. For example, as shown in FIG. 4, the AHI interface module 412 updates AHI applications 421 to include the additional application.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access application modules 415, storage system 420, or related data available in the cloud. For example, the application modules 415 could execute on a computing system in the cloud and establish and manage an application host interface using the computing system in the cloud. Doing so allows a user to utilize the AHI and access stored information such as the AHI applications information from any computing system attached to a network connected to the cloud (e.g., the Internet).

The flowchart and block diagrams in the FIGS. 2-7 illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for providing direct external network access at an access point (AP) in a managed wide area network (WAN) comprising:
    establishing, at the AP, an application host interface (AHI) on a public subnet associated with an external network, allowing data to access the external network and a plurality of external data destinations while bypassing a default subnet of the AP connected to a remote wireless local access network controller (WLC),
        wherein the remote WLC controls the managed WAN via the default subnet,
        wherein the default subnet is established over the external network,
        wherein the AHI serves as an AHI for at least one forwarding AP in the managed WAN, and
        wherein the external network is external to the managed WAN network;
    receiving forwarded application data for the AHI from the at least one forwarding AP;
    routing, the forwarded application data via the external network thereby bypassing the WLC;
    receiving application data from one or more client devices, where the application data comprises a data destination that is external to the managed WAN;
    determining, from a list of applications permitted to use the AHI, that the application data is received from a permitted application;
    in response to determining the application is permitted to use the AHI, routing, using the AHI, the received application data to the data destination via the external network thereby bypassing the WLC;
    in response to determining the application is permitted to use a second AHI hosted at a second AP in the managed WAN, forwarding the received application data to the second AHI for routing via the external network thereby bypassing the WLC via the second AHI; and
    in response to determining the application is not permitted to use the AHI or the second AHI, routing the application data to the remote WLC.

2. The method of claim 1, wherein the default subnet comprises a Control And Provisioning of Wireless Access Points (CAPWAP) tunnel; and
wherein the method further comprises:
    determining, from the list of applications on the AP permitted to use the AHI, that the application data is not from a permitted application; and
    routing the received application data through the default subnet and the CAPWAP tunnel to the WLC.

3. The method of claim 1, wherein the method further comprises:
    receiving incoming application traffic from the external network for the list of applications at the AHI.

4. The method of claim 1, wherein the method further comprises:
    blocking incoming application traffic from the external network for the list of applications at the AHI.

5. The method of claim 1, wherein the managed wide area network comprises a plurality of APs, wherein the plurality of APs comprises one or more forwarding APs and one or more AHI APs, wherein the AHI is established at the one or more AHI APs; and wherein the method further comprises:
    receiving additional application data at one of the one or more forwarding APs;
    determining, from a list of applications on the forwarding AP permitted to use the AHI, that the additional application data is from a permitted application; and
    transmitting the additional application data to one of the one or more AHI APs for utilization of the AHI.

6. The method of claim 1, wherein the method further comprises:
    receiving application configuration for information for an additional application, wherein the application configuration information comprises configuration information for the application to use the AHI; and updating the list of applications on the AP permitted to use the AHI to include the additional application.

7. The method of claim 1, wherein the default subnet of the AP comprises a private subnet connected to the WLC.

8. A system, comprising:
a processor; and
a memory comprising instructions which, when executed on the processor, performs an operation for providing direct external network access at an access point (AP) in a managed wide area network (WAN), the operation comprising:
establishing, at the AP, an application host interface (AHI) on a public subnet associated with an external network, allowing data to access the external network and a plurality of external data destinations while bypassing a default subnet of the AP connected to a remote wireless local access network controller (WLC) for the managed WAN,
wherein the remote WLC controls the managed WAN via the default subnet,
wherein the default subnet is established over the external network,
wherein the AHI serves as an AHI for at least one forwarding AP in the managed WAN; and
wherein the external network is external to the managed WAN network;
receiving forwarded application data for the AHI from the at least one forwarding AP;
receiving application data from one or more client devices, where the application data comprises a data destination that is external to the managed WAN;
routing, the forwarded application data via the external network thereby bypassing the WLC;
determining, from a list of applications permitted to use the AHI, that the application data from the one or more client devices is received from a permitted application;
in response to determining the application is permitted to use the AHI, routing, using the AHI, the received application data to the data destination via the external network thereby bypassing the WLC;
in response to determining the application is permitted to use a second AHI hosted at a second AP in the managed WAN, forwarding the received application data to the second AHI for routing via the external network thereby bypassing the WLC via the second AHI; and
in response to determining the application is not permitted to use the AHI or the second AHI, routing the application data to the remote WLC.

9. The system of claim 8, wherein the default subnet comprises a Control And Provisioning of Wireless Access Points (CAPWAP) tunnel; and
wherein the operation further comprises:
determining, from the list of applications on the AP permitted to use the AHI, that the application data is not from a permitted application; and
routing the received application data through the default subnet and the CAPWAP tunnel to the WLC.

10. The system of claim 8, wherein the operation further comprises:
receiving incoming application traffic from the external network for the list of applications at the AHI.

11. The system of claim 8, wherein the operation further comprises:
blocking incoming application traffic from the external network for the list of applications at the AHI.

12. The system of claim 8, wherein the managed wide area network comprises a plurality of APs, wherein the plurality of APs comprises one or more forwarding APs and one or more AHI APs, wherein the AHI is established at the one or more AHI APs; and wherein the operation further comprises:
receiving additional application data at one of the one or more forwarding APs;
determining, from a list of applications on the forwarding AP permitted to use the AHI, that the additional application data is from a permitted application; and
transmitting the additional application data to one of the one or more AHI APs for utilization of the AHI.

13. The system of claim 8, wherein the operation further comprises:
receiving application configuration for information for an additional application, wherein the application configuration information comprises configuration information for the application to use the AHI; and
updating the list of applications on the AP permitted to use the AHI to include the additional application.

14. The system of claim 8, wherein the default subnet of the AP comprises a private subnet connected to the WLC.

15. A computer program product for providing direct external network access at an access point (AP) in a managed wide area network (WAN), the computer program product comprising a non-transitory computer-readable medium program having program instructions embodied therewith, the program instructions executable by a processor to perform an operation comprising:
establishing, at the AP, an application host interface (AHI) on a public subnet associated with an external network allowing data to bypass a default subnet of the AP connected to a remote wireless local access network controller (WLC) for the managed WAN to access an external network,
wherein the remote WLC controls the managed WAN via the default subnet,
wherein the default subnet is established over the external network,
wherein the AHI serves as an AHI for at least one forwarding AP in the managed WAN, and
wherein the external network is external to the managed WAN network;
receiving forwarded application data for the AHI from the at least one forwarding AP;
routing, the forwarded application data via the external network thereby bypassing the WLC;
receiving application data from one or more client devices, where the application data comprises a data destination that is external to the managed WAN;
determining, from a list of applications permitted to use the AHI, that the application data is received from a permitted application;
in response to determining the application is permitted to use the AHI, routing, using the AHI, the received application data to the data destination via the external network thereby bypassing the WLC;
in response to determining the application is permitted to use a second AHI hosted at a second AP in the managed WAN, forwarding the received application data to the second AHI for routing via the external network thereby bypassing the WLC via the second AHI; and
in response to determining the application is not permitted to use the AHI or the second AHI, routing the application data to the remote WLC.

16. The computer program product of claim 15, wherein the default subnet comprises a Control And Provisioning of Wireless Access Points (CAPWAP) tunnel; and wherein the operation further comprises:

determining, from the list of applications on the AP permitted to use the AHI, that the application data is not from a permitted application; and routing the received application data through the default subnet and the CAPWAP tunnel to the WLC.

17. The computer program product of claim 15, wherein the operation further comprises:

receiving incoming application traffic from the external network for the list of applications at the AHI.

18. The computer program product of claim 15, wherein the operation further comprises:

blocking incoming application traffic from the external network for the list of applications at the AHI.

19. The computer program product of claim 15, wherein the managed wide area network comprises a plurality of APs, wherein the plurality of APs comprises one or more forwarding APs and one or more AHI APs, wherein the AHI is established at the one or more AHI APs; and wherein the operation further comprises:

receiving additional application data at one of the one or more forwarding APs;

determining, from a list of applications on the forwarding AP permitted to use the AHI, that the additional application data is from a permitted application; and transmitting the additional application data to one of the one or more AHI APs for utilization of the AHI.

20. The computer program product of claim 15, wherein the operation further comprises:

receiving application configuration for information for an additional application, wherein the application configuration information comprises configuration information for the application to use the AHI; and updating the list of applications on the AP permitted to use the AHI to include the additional application.

* * * * *